(12) United States Patent
Reif et al.

(10) Patent No.: US 12,110,724 B2
(45) Date of Patent: Oct. 8, 2024

(54) ACTUATOR FOR VEHICLE FLAP

(71) Applicant: Stabilus GmbH, Koblenz (DE)

(72) Inventors: Thomas Reif, Kobern-Gondorf (DE); Jörg Hillen, Nörtershausen (DE)

(73) Assignee: Stabilus GmbH, Koblenz (DE)

( * ) Notice: Subject to any disclaimer, the term of this patent is extended or adjusted under 35 U.S.C. 154(b) by 446 days.

(21) Appl. No.: 16/689,815

(22) Filed: Nov. 20, 2019

(65) Prior Publication Data

US 2020/0165858 A1 May 28, 2020

(30) Foreign Application Priority Data

Nov. 22, 2018 (DE) ................. 10 2018 220 080.7

(51) Int. Cl.
*E05F 15/622* (2015.01)
*B60J 5/04* (2006.01)
*B60J 5/06* (2006.01)
*E05F 15/603* (2015.01)

(52) U.S. Cl.
CPC ............ *E05F 15/622* (2015.01); *B60J 5/047* (2013.01); *B60J 5/062* (2013.01); *E05F 15/603* (2015.01); *E05Y 2201/686* (2013.01); *E05Y 2201/696* (2013.01); *E05Y 2900/531* (2013.01)

(58) Field of Classification Search
CPC ........ E05F 15/622; F16H 37/06; F16H 37/12; E06B 3/5009
USPC .................................... 49/334, 335, 340, 341
See application file for complete search history.

(56) References Cited

U.S. PATENT DOCUMENTS

| 3,315,413 | A | * | 4/1967 | Beecher | E05F 15/614 220/264 |
| 4,850,094 | A | * | 7/1989 | Lybecker | E05F 15/616 29/434 |
| 5,804,938 | A | * | 9/1998 | Richmond | E05F 15/622 318/470 |
| 2018/0223583 | A1 | * | 8/2018 | Podkopayev | F16D 3/207 |
| 2020/0370357 | A1 | * | 11/2020 | Schmengler | E05F 15/622 |

FOREIGN PATENT DOCUMENTS

| CN | 103498614 A | 1/2014 |
| CN | 105378258 A | 3/2016 |
| CN | 105960353 A | 9/2016 |
| DE | 3132320 A1 | 3/1983 |
| DE | 3705369 A1 | 9/1988 |
| DE | 102008056680 A1 | 5/2010 |
| DE | 10 2018 201 840 A1 | 8/2018 |
| EP | 1770237 A2 | 4/2007 |
| EP | 3 211 271 * | 8/2017 |

(Continued)

OTHER PUBLICATIONS

Chinese Application No. CN201911155980.1, Office Action mailed May 31, 2022, 7 pages.

*Primary Examiner* — Gregory J Strimbu
(74) *Attorney, Agent, or Firm* — Kilpatrick Townsend & Stockton LLP

(57) ABSTRACT

An actuator includes a spindle drive, a first gear which causes a translational displacement of a first connection unit connected to the spindle drive, and a second gear which engages with the first gear and is connected to a second connection unit. The relative rotation of the two gears causes an actuation of the spindle drive and a rotation of the spindle drive about the rotational axis of the second gear.

7 Claims, 8 Drawing Sheets

(56) References Cited

FOREIGN PATENT DOCUMENTS

| | | |
|---|---|---|
| FR | 2828231 A1 | 2/2003 |
| FR | 3006379 A1 | 12/2014 |
| GB | 2105810 A | 3/1983 |

* cited by examiner

ACTUATOR FOR VEHICLE FLAP

CROSS REFERENCE TO RELATED APPLICATION

This application claims priority to German Patent Application No. 10 2018 220 080.7, filed in Germany on Nov. 22, 2018, the entire contents of which are hereby incorporated herein by this reference.

FIELD OF APPLICATION

The present invention relates to an actuator which is designed to displace two parent assemblies, between which the actuator is arranged, relative to each other.

BACKGROUND

Such actuators are known for example in the field of vehicle doors, such as pivoting doors on buses. Therefore, the invention will be described below with reference to this application, it being expressly understood that the invention is of course not to be limited thereto. In the field of pivoting doors, it is also known to use rigid coupling rods which are connected at one end to a body of the vehicle and at the other end to the door. If the door is displaced relative to the body, the door follows a path predetermined by the coupling rods. Since the path of the possible displacement of the door relative to the body is usually in the form of a circular arc, the attachment point of the coupling rods to the body is thereby predetermined. Furthermore, the door usually pivots far away from the body by means of the rigid coupling rod until it rests against the body in its opened state.

SUMMARY

It is therefore an object of the present invention to provide an actuator which, on the one hand, makes it possible to displace an assembly, such as a door, along a curved but not necessarily arcuate path, and which, on the other hand, makes it possible to be able to arrange the connecting point of the actuator on the body in a larger region than when using rigid coupling rods.

This object is achieved by an actuator comprising a spindle drive, which comprises a spindle and a spindle nut threadedly engaged with the spindle, a first gear, which is rotationally coupled to the spindle or the spindle nut, wherein the respective other from the spindle nut or the spindle is connected to a first connection unit for connecting the actuator to a first parent assembly, wherein the spindle drive is designed such that a rotation of the first gear causes a translational displacement of the first connection unit, and a second gear, which engages with the first gear and which is rotationally coupled to a second connection unit for connecting the actuator to a second parent assembly, wherein a longitudinal axis of the spindle drive is inclined with respect to a central axis, in particular to a rotation axis, of the second gear, wherein the actuator is designed such that a relative rotation of the two gears with respect to each other causes an actuation of the spindle drive and a displacement of the spindle drive relative to the central axis of the second gear or an actuation of the spindle drive causes a relative rotation of the two gears with respect to each other and a displacement of the spindle drive relative to the central axis of the second gear.

Such an actuator allows two combined movements. It allows, on the one hand, a rotation of the spindle drive, and thus of the first parent assembly connected to the spindle drive, relative to the second parent assembly and, on the other hand, a translational displacement of the first parent assembly relative to the axis of rotation of the spindle drive relative to the second parent assembly.

In particular, a "rotation of the spindle drive" may be understood to mean that the entire spindle drive or at least the spindle and the spindle nut are displaced together. Furthermore, a "rotation of the spindle drive" may mean that a central axis of the spindle and/or the spindle nut is rotated about an element connected to the second parent assembly, for example a central axis of the second connection unit or a central axis of the second gear. It should also be noted that an "inclination" of the longitudinal axis of the spindle drive with respect to the central axis of the second gear may include any inclination deviating from a coaxiality, for example 30°, 450 or 90°.

The first parent assembly, which is formed for example by a door to be pivoted, can thereby be displaced along an elliptical path, for example, or along a circular path whose centre lies outside the actuator. Thus, the two end positions of a total displacement range of the first parent assembly, for example a first end position in which the door closes a passage region, and a second end position in which the door is displaced out of the passage region and abuts a vehicle body, can be spaced apart further from each other. As a result, in turn, larger passage regions can be realized.

For example, at least one of the first gear and the second gear may be a bevel gear or a crown gear, which may be inclined with respect to each other according to the "inclination" described above.

Advantageously, the actuator may be designed such that a predetermined activation position of the spindle drive is associated with exactly one angular position of the displacement of the spindle drive relative to the central axis of the second gear and vice versa. In this way, a displacement of the spindle or the spindle nut is accompanied by a positively coupled displacement of the spindle drive about the central axis of the second gear. This means that each angle of the spindle drive about this central axis is associated with exactly one elongation of the spindle drive. This can thus prevent the first connection unit from occupying more than a single predetermined position in three-dimensional space when the angle of the spindle drive about the central axis, i.e. relative to the second parent assembly, remains constant.

In one development of the present invention, the second gear can be rotationally coupled to a housing surrounding the second gear, and the actuator can be designed such that a relative displacement of the two gears with respect to each other causes rotation of the housing relative to the second connection unit. This means that a rotation of the second gear can cause a rotation of the housing. If the spindle drive, which may for example likewise be arranged in a housing, is connected to the housing surrounding the second gear, for example via the housing of the spindle drive, the rotation of the housing can also cause a rotation of the spindle drive. Thus, a rotation of the second gear may drive an activation of the spindle drive and a rotation of the housing surrounding the second gear.

In this case, a transmission can be arranged between the second gear and the housing, which transmission provides a translation between a rotation of the second gear and a rotation of the housing. The transmission may translate a first rotational speed and/or a first torque of the rotation of the second gear on the gear side of the transmission into a second rotational speed and/or into a second torque on the housing side of the transmission.

Advantageously, the gearbox can engage with the second gear via a first thread having a first thread pitch and with the housing via a second thread having a second thread pitch, wherein the first thread pitch can be different from the second thread pitch. It is thus possible to drive the spindle drive and the rotation of the housing at two different rotational speeds. In particular, the thread pitches are selected such that a rotational speed of the housing, and thus optionally of the spindle drive, relative to the second parent assembly, is smaller than a rotational speed of the spindle or the spindle nut of the spindle drive. By setting the ratio of the first thread pitch to the second thread pitch, it is possible to define over which angular range the spindle drive is pivoted while moving from a first, for example fully retracted, end position into a second, for example fully extended, end position. Of course, it is also conceivable that the two threads each have constant, but optionally different, thread pitches, as well as that a relevant thread comprises threaded portions with varying thread pitches. As a result, for example, an elongation of the spindle drive in a first predefined angular range of pivoting of the spindle drive or of the housing relative to the second parent assembly may be smaller than in a second predefined angular range of this kind.

The transmission may further include an intermediate piece threadedly engaged with the housing and the second gear and coupled to the second connection unit for conjoint rotation but so as to be axially displaceable. The arrangement of an intermediate piece, which has two separate threaded portions which comprise different thread pitches, can avoid the provision of a complex transmission arrangement, such as a planetary transmission. As a result, both the required space and susceptibility to errors of the arrangement can be significantly reduced.

Advantageously, the actuator may comprise a drive unit, in particular an electric motor, which is designed to drive at least one of the first gear, the second gear, the spindle, the spindle nut and the housing. The drive unit can be designed to receive an activation signal which indicates at least one of a rotational direction and a rotational speed in which the drive unit is to be driven.

It should also be added that it is irrelevant to the scope of the present invention whether the element to be pivoted of the parent assembly is connected to the first connection unit or to the second connection unit. A description of an embodiment in which the element to be pivoted is connected to the variable-length portion of the actuator is given below.

In a second aspect, the invention relates to a support device for a flap, in particular a pivoting door, comprising a four-joint arrangement which comprises two mutually parallel and laterally spaced coupling rods which at their relevant one end are pivotally connected to a parent assembly, in particular a vehicle body, a pivot member to which the coupling rods of the four-joint arrangement, in particular adjacent to an edge of the pivot member, are pivotally connected at their relevant other end, and an actuator, in particular an actuator according to the invention with one of the aforementioned features, which is pivotally connected at its one end to the parent assembly and is pivotally connected at its other end to the pivot member, and which is designed, upon activation of the actuator, to displace the pivot member relative to the parent assembly.

Pivot members, in particular vehicle doors, are known from the prior art, which are connected at their vertical longitudinal ends via a relevant four-joint arrangement to a vehicle body. These four-joint arrangements can be poorly disguised, i.e. integrated into a design of a vehicle, and sometimes occupy a lot of space in the interior of a vehicle when closed. Due to the large installation space required for such a four-joint arrangement, in particular when the door is closed, and when an entire access area is cleared as desired in the open position, only small door widths can be realized. Wide entry areas are often realized by two opposing doors with a relevant four-joint arrangement. Especially in the field of curved roof structures, such a four-joint arrangement often may not be appropriate.

The second aspect of the present invention may now make it possible to dispense with the upper four-joint arrangement, that is to provide only a single four-joint arrangement between the pivot member and the parent assembly. Here, the actuator can be, for example, a rotary drive, for example arranged in a joint. In this case, the pivot member may be connected to the coupling rods of the four-joint arrangement using ball joints, so that not only a pivoting between the pivot member and the coupling rods but also a tilting is allowed. In this way, tolerances and deviations in the trajectories of the four-joint arrangement and the actuator can be compensated for.

It should be again explicitly noted at this point that the features and advantages of the described actuator according to the invention apply equally to the support device and vice versa.

Furthermore, the actuator may comprise a coupling rod which is arranged parallel to the coupling rods of the four-joint arrangement and laterally spaced therefrom, in particular evenly spaced therefrom. When the coupling rod is arranged, as seen in a vertical direction or along a horizontal direction, between the coupling rods of the four-joint arrangement, it is possible to reduce the space required for supporting the pivot member on the parent assembly.

In particular, the two coupling rods of the four-joint arrangement or the two coupling rods of the four-joint arrangement and the coupling rod of the actuator may have an equal length. If connecting points of all coupling rods are now arranged on the parent assembly and/or on the pivot member on a common, preferably vertical, plane, it may be possible that the pivot member remains aligned during pivoting parallel to this plane. In other words, this can prevent the pivot member from inclining out of a, for example, vertical orientation.

The actuator may, in an operative state of the support device, be arranged vertically above the four-joint arrangement, in particular in the region of half a vertical extension of the pivot member.

For example, the four-joint arrangement can be arranged in the region of a floor of a vehicle, so that the four-joint arrangement can take up sufficient installation space without impairing a passenger compartment and/or an external design of the vehicle. The four-joint arrangement can therefore be designed to be very stable, so that it can fully support the weight of an element to be pivoted, for example. The actuator can now be assigned only the task of driving the element to be pivoted and preventing it from tilting out of a predefined orientation. Accordingly, the actuator can be designed to save space.

The support device according to the invention could be also designed, for example, for a window or the like, instead of for a pivoting door.

In a third aspect of the present invention, the invention relates to a support device for a flap, in particular a pivoting door, comprising an actuator, in particular an actuator according to the invention with one of the aforementioned features, which at its one end is pivotally connected to a parent assembly, in particular a vehicle body, and a pivot member to which the other end of the actuator, in particular adjacent to an edge of the pivot member, is pivotally connected, wherein the actuator is designed, upon activation, to perform a combined change in length of a first portion and a relative rotation of the variable-length portion relative to a second portion of the actuator that is associated with one end of the variable-length portion, in order to displace the pivot member relative to the parent assembly, wherein the actuator is formed such that a predetermined activation position of the variable-length portion is associated with exactly one angular position of the displacement of the variable-length portion relative to a pivot axis of the variable-length portion and vice versa.

Although it is only necessary for the scope of the third aspect of the present invention that the actuator has a positive coupling between the change in length of the first portion and the pivoting of the first portion about the pivot axis, the actuator is described below using the example of the actuator according to the invention according to a first aspect of the present invention.

Of course, it is also conceivable that instead of the spindle drive, for example, a hydraulically, pneumatically or magnetically operated drive is provided, the activation of which is not mechanically coupled, but coupled using a suitable measuring device, for example.

It should also be noted that the "displacement of the variable-length portion relative to a pivot axis of the variable-length portion" does not necessarily mean that it is the variable-length portion of the actuator which is visibly pivoted. For example, the variable-length portion may be connected to a vehicle body, and a non-variable-length portion of the actuator is pivoted. It is crucial that, between a variable-length portion of the actuator and another portion of the actuator, a relative rotation is carried out while the variable-length portion is activated, i.e. changed in length.

By using an actuator which has a positive coupling between its change in length and its rotation, it is possible to vary the connecting point of the actuator to the parent assembly almost arbitrarily. Nevertheless, a displacement of the pivot member parallel, for example, to an outer surface of the parent assembly can be performed.

In a further development of the present invention, the actuator may be connected, at its end associated with the variable-length portion, to the parent assembly and comprise a spacer arranged between the variable-length portion of the actuator and the pivot member. For example, a spindle drive of the actuator may be connected to the vehicle body in such a way that, upon activation of the spindle drive, the end of the spindle drive connected to the spacer is displaced relative to the vehicle body. In this case, the spacer, which is formed for example by a rigid rod, is rotated relative to the spindle drive. Such an arrangement may result in a rotation centre of the spacer being linearly displaced according to the change in length of the spindle drive. In this way, a pivot member such as a door can be displaced not only in accordance with the pivoting range defined by the rotation of the spacer, but also in accordance with the stroke of the spindle drive. As the pivot point of the hinge displaces, there may be an increase in a possible entry area, which is released by opening the door.

Of course, further coupling rods can be provided between the pivot member and the vehicle body for further support and mounting, for example in the form of a four-joint arrangement.

In a particular embodiment of the present invention, the support device may comprise a further actuator, in particular an actuator according to the invention having one of the above-mentioned features, which is pivotally connected at its one end to the parent assembly and at its other end to the pivot member, wherein the further actuator may be designed to perform, upon activation, a combined change in length of a first portion and a relative rotation of the variable-length portion relative to a second portion of the further actuator that is associated with one end of the variable-length portion, in order to displace the pivot member relative to the parent assembly, wherein the further actuator may be formed such that a predetermined activation position of the variable-length portion is associated with exactly one angular position of the displacement of the variable-length portion relative to a pivot axis of the variable-length portion and vice versa.

Through the arrangement of two above-mentioned positively coupled actuators, the arrangement of further coupling rods and/or four-joint arrangements can be completely dispensed with. Furthermore, this can make it possible to displace a door maximally out of an entry area. By suitably selecting the ratio of rotation to change in length of the relevant actuator, a connection of the respective actuator to the parent assembly can be chosen almost freely.

Advantageously, a thread pitch direction of a spindle of a first spindle drive of the one actuator can be in the opposite direction to a thread pitch direction of a spindle of a second spindle drive of the other actuator. In particular, it can thereby be made possible for the connection points of the two actuators to lie on a common, for example vertical, axis which is in particular parallel to a main extension direction of the pivot member. A parallel movement of the pivot member with respect to the parent assembly can thus be achieved. Over a pivoting range of the pivot member, for example of the door, the variable-length portion of the one actuator can thus be shortened, while at the same time the variable-length portion of the further actuator is extended.

Again, the support device according to the invention could also be designed, for example, for a window or the like, instead of for a pivoting door.

In the following, the present invention will be described in more detail based on exemplary embodiments with reference to the accompanying drawings, in which FIG. 1 is a perspective view of an embodiment of an actuator according to the invention;

DETAILED DESCRIPTION

Figure 1:
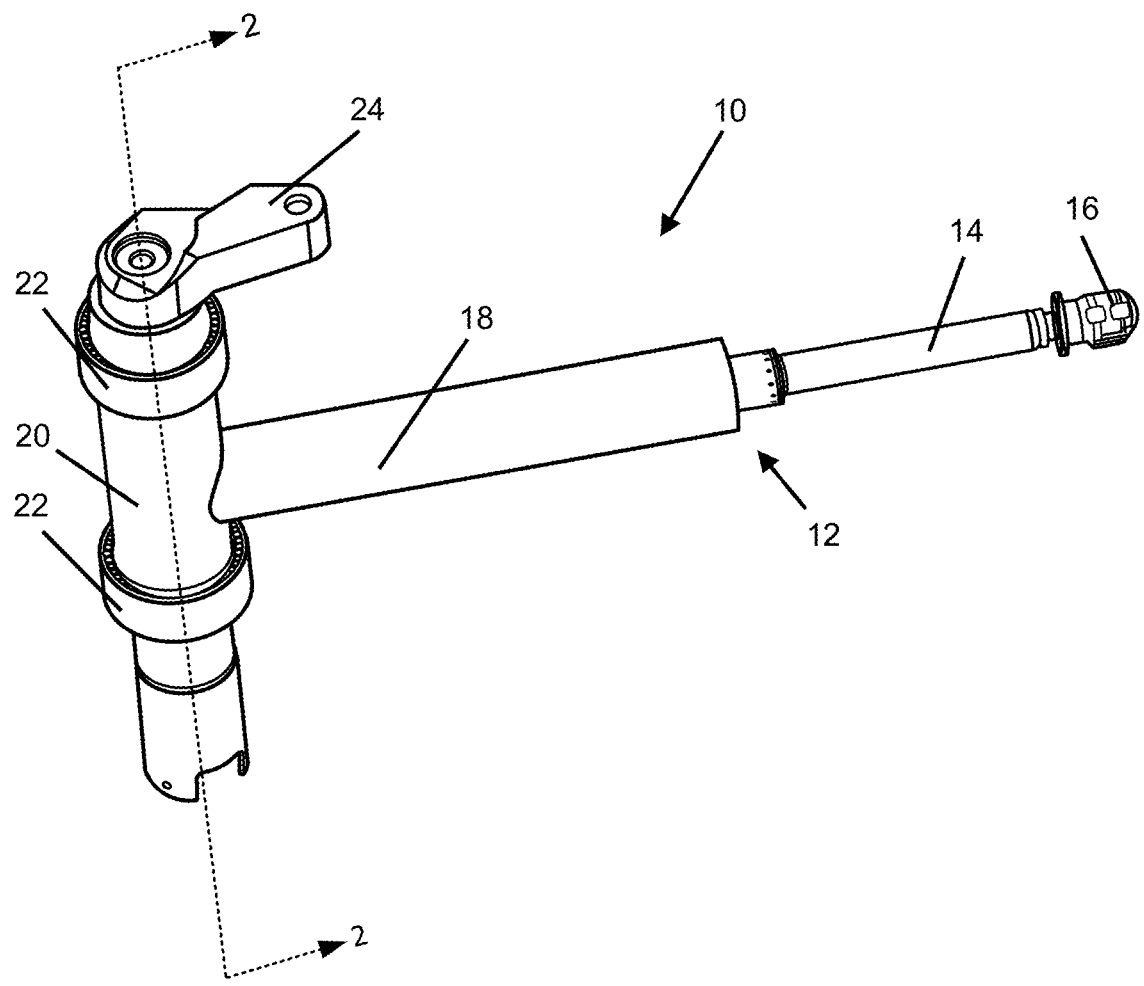

In FIG. 1, an actuator according to the invention is generally provided with the reference numeral 10. The actuator 10 comprises a variable-length first portion 12, which is formed here by a spindle drive 12. The spindle drive 12 comprises a cladding tube 14, which is connected to a first connection unit 16 in order to connect the actuator 10 to a first parent assembly (not shown).

At its end opposite the first connection unit 16, the spindle drive 12 is surrounded by a tube 18, which is firmly connected to a housing 20 of the actuator 10. The housing 20 is rotatably supported by two supports 22 relative to a second parent assembly (not shown). Furthermore, the actuator is attached to the second parent assembly by means of a second connection unit 24. The housing 20 is supported rotatably but in an axially fixed manner relative to the second connection unit 24.

Figure 2:
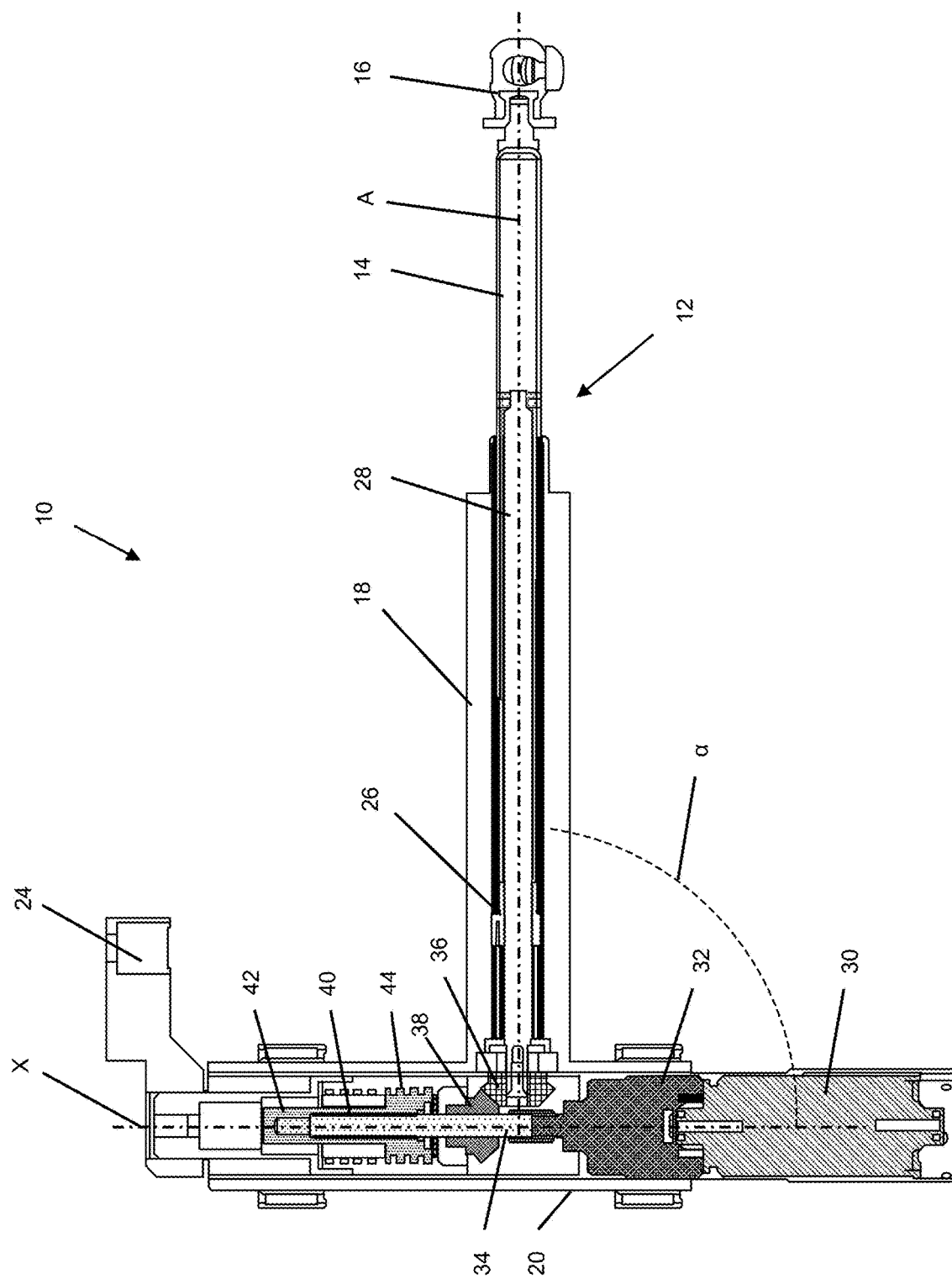
FIG. 2 is a side cross-sectional view of the actuator according to the invention of FIG. 1.

In the cross section of the actuator 10 shown in FIG. 2, it can be seen that the cladding tube 14 is connected to a spindle nut 26, which in turn is in threaded engagement with a spindle 28 of the spindle drive 12. A rotation of the spindle 28 thus causes an axial displacement of the spindle nut 26, whereby the cladding tube 14 and thus the first connection unit 16 are to be displaced away from the housing 20 and to the housing 20.

FIG. 2 also shows a drive unit 30 which is formed, for example, by an electric motor. The drive unit 30 is connected to a transmission unit 32, which is connected at its side opposite the drive unit 30 to an output shaft 34.

A first gear 36 connected to the spindle 28 for conjoint rotation is in engagement with a second gear 38 connected to the output shaft 34 for conjoint rotation. If the drive unit 30 now drives the output shaft 34 and thus the second gear 38, the first gear 36 is set in rotation together with the spindle 28. As a result, as mentioned above, the spindle nut 26 is displaced along an axis A, which here also forms a central axis of the spindle 28.

On its side opposite the transmission unit 32, the output shaft 34 comprises a first thread 40, which engages with a corresponding mating thread of an intermediate element 42. The intermediate element 42 is supported, for conjoint rotation relative to the second connection unit 24 but so as to be axially displaceable, on a portion which is arranged in the embodiments shown in FIG. 2 at an upper end of the intermediate element 42. At the other lower end of the intermediate element 42, a second thread 44 is arranged, which is in engagement with a corresponding mating thread which is fixedly connected to the housing 20 or formed on an inner side of the housing 20.

The first thread 40 here has a significantly smaller thread pitch than the second thread 44. Upon rotation of the output shaft 34, the intermediate element 42 is displaced axially relative to the output shaft 34 and the second connection unit 24 via the first thread 40 and due to the above-described axial toothing with respect to the second connection unit 24. Due to the second thread 44 between the intermediate element 42 and the housing 20, the housing 20 is set in rotation upon a translational displacement of the intermediate element 42. The housing 20 in this case rotates about a pivot axis X, which here also forms a central axis of the output shaft 34 and/or of the intermediate element 42 and/or of the second gear 38.

As a result, this means that an activation of the drive unit 30 causes a rotation of the output shaft 34 and the gear 38 connected thereto, whereby the spindle drive 12 is activated, i.e. extended or shortened, via the first gear 36, and the tube 18 is pivoted about the pivot axis X together with the spindle drive 12 and the housing 20 relative to the second connection unit 24.

It should again be noted that this results in a positive coupling, so that a change in length of the spindle drive 12 may not be performed without a rotation of the housing 20, and vice versa. Furthermore, this means that, depending on the selection of the first thread 40, the second thread 44, the two gears 36, 38 and/or the spindle drive 12, each angle of the housing 20 relative to the second connection unit 24 is associated with exactly one length position of the spindle drive 12.

Of course, the actuator 10 according to the invention can also be formed also as a passive unit, that is at least without the drive unit 30, in which a rotation of the housing 20 causes a change in length of the spindle drive 12 or a change in length of the spindle drive 12 causes a rotation of the housing 20 relative to the second connection unit 24, for example due to manual operation.

An angle α between the axis A and the pivot axis X is approximately 90° in the embodiment shown in FIG. 2.

Figure 3:
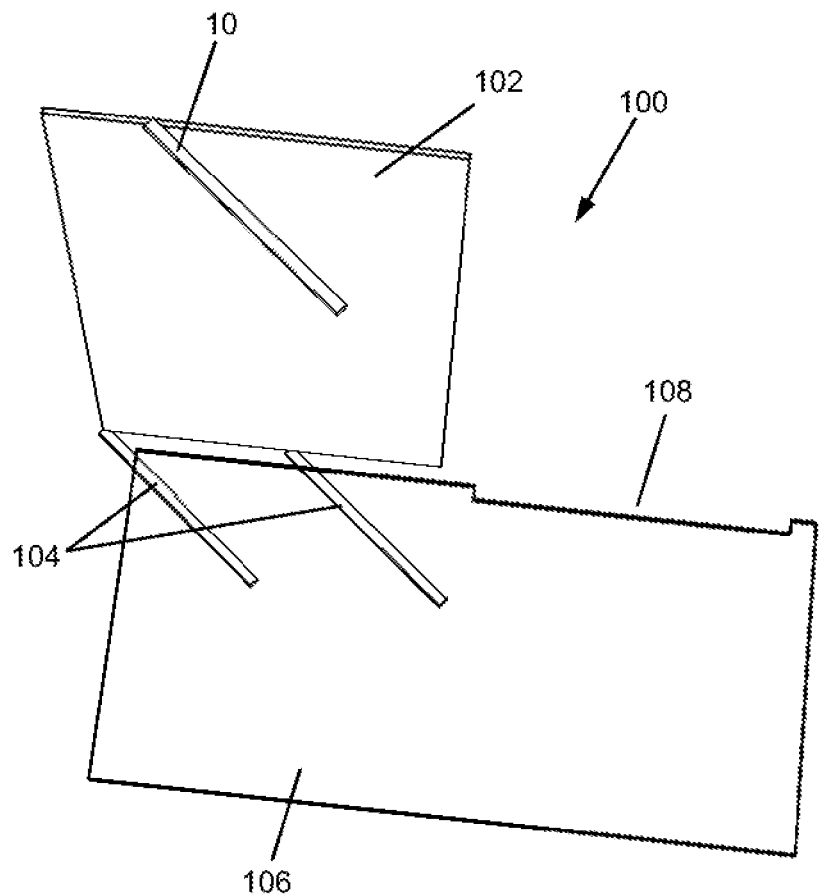
FIG. 3 is a schematic view of a portion of a pivoting door in a first embodiment.

In the support device 100 shown in FIG. 3, a door is shown as a pivot member 102. For the inventive concept of FIG. 3 to be described, it is irrelevant at this point whether the door 102 is completely illustrated, or whether only a lower half of the door 102, for example, is shown in FIG. 3.

The door 102 is connected to a vehicle body 106 by means of a four-joint arrangement 104. The four-joint arrangement 104 is formed here from two identical coupling rods arranged parallel to one another. The four-joint arrangement 104 is hinged to the vehicle body 106 such that the coupling rods of the four-joint arrangement 104 can pivot relative to the vehicle body 106 along only a single, for example horizontal, plane.

At a vertically higher position of the door 102, an actuator, in particular an actuator 10 as described above, is arranged between the door 102 and a portion (not shown) of the vehicle body 106. In this case, in FIG. 3, the actuator 10 is aligned parallel to the coupling rods of the four-joint arrangement 104, so that the actuator 10 in the illustration of FIG. 3 can also be a rotary drive with a rigid coupling rod between the rotary drive and the door 102.

FIG. 3 illustrates the state in which the door 102 is pivoted out of an access opening 108 of a vehicle comprising the vehicle body 106 in order to release the access opening 108.

Figure 4A:
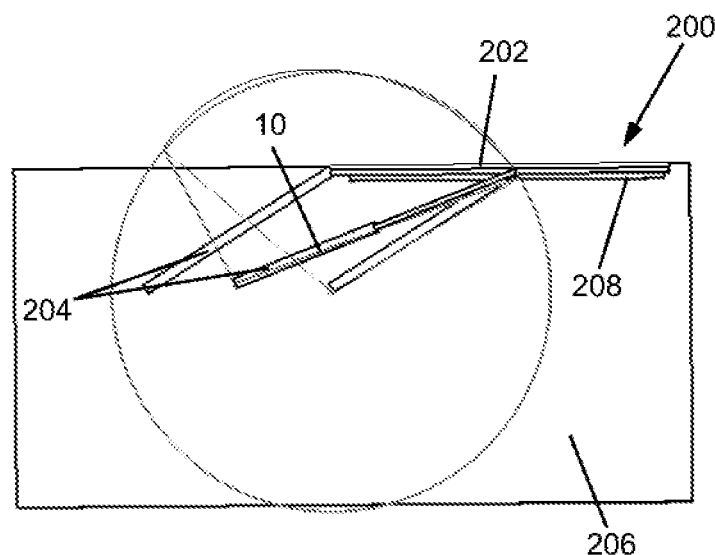
FIG. 4a is a schematic view of a portion of a pivoting door in a second embodiment and a first positioning.
Figure 4B:
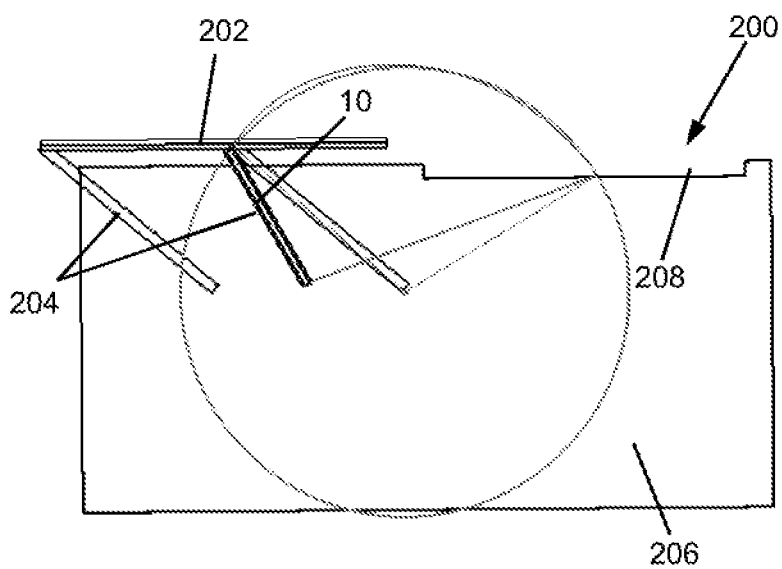
FIG. 4b is a schematic view of a portion of a pivoting door in the second embodiment of FIG. 4a and a second positioning.

In FIGS. 4a and 4b, a support device 200 is shown, in which the "two-joint" with a fixed coupling rod is replaced by a variable-length actuator 10. Moreover, the arrangement 200 shown in FIGS. 4a and 4b corresponds to a plan view of the arrangement 100 shown in FIG. 3, to which reference is explicitly made at this point. Accordingly, only the differences between the arrangement 200 shown in FIGS. 4a and 4b and the arrangement 100 shown in FIG. 3 will be described below.

In contrast to the support device 100, the actuator 10 of the support device 200 may be connected to the vehicle body 206 at almost any location. In the embodiment illustrated in FIGS. 4a and 4b, the actuator 10, as seen in the vertical plan view of these figures, is arranged between the two coupling rods of the four-joint arrangement 204. However, it will be appreciated that the connection point between the actuator and the vehicle body 206 is not located centrally between the two coupling rods of the four-joint arrangement 204, but is arranged adjacent to the coupling rod of the four-joint arrangement 204 that is arranged remotely from the access opening 208. As in the support device 100, the actuator of the support device 200 may also be arranged, for example, at half the height of the door 202, but in any case vertically above the four-joint arrangement 204.

In FIG. 4*a*, the state is shown in which the door 202 closes the access opening 208. The actuator 10 is in its extended end position.

In FIG. 4*b*, the state is shown accordingly in which the door 202 releases the access opening 208. The actuator 10 is in its retracted end position.

Figure 5A:
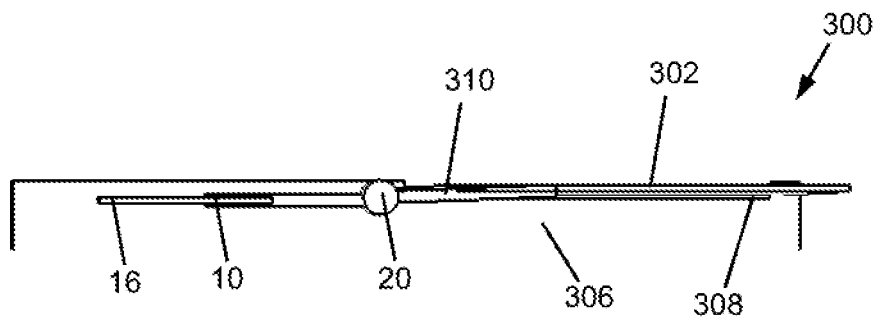
FIG. 5a is a schematic view of a support device according to the invention in a first position.
Figure 5B:
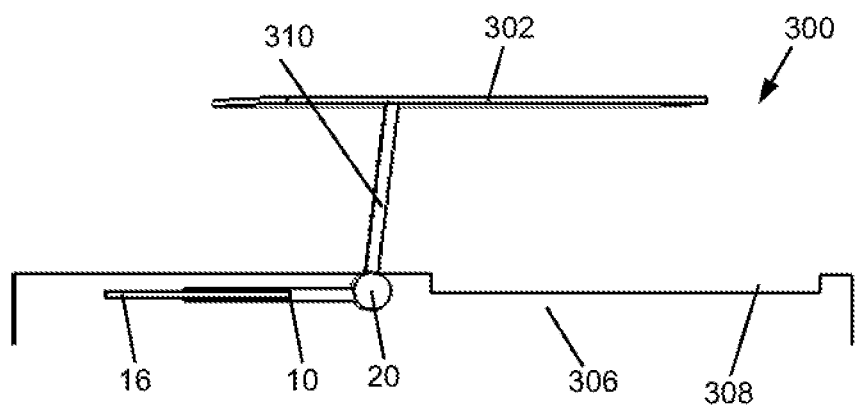
FIG. 5b is a schematic view of the support device according to the invention in a second position.
Figure 5C:
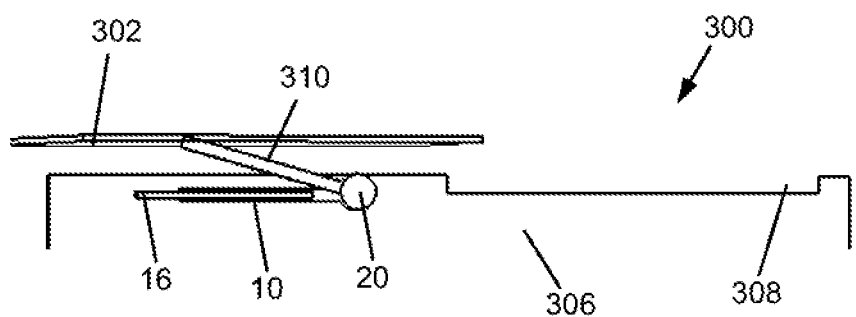
FIG. 5c is a schematic view of the support device according to the invention in a third position.

FIGS. 5*a*, 5*b* and 5*c* show a further possible arrangement of a support device 300. Just as the FIGS. 3, 4*a* and 4*b*, to which reference is explicitly made in relation to the following description, FIGS. 5*a* to 5*c* also show a door 302 which can close or release an access opening 308 of a vehicle comprising a vehicle body 306.

Connected to the vehicle body 306 is an actuator 10 according to the invention, as described above. In this case, the actuator 10 is connected, by means of its free end of the variable-length portion, to the vehicle body 306. With reference to the embodiment of the actuator 10 described in FIGS. 1 and 2, the first connection unit 16 is connected to the vehicle body 306. A spacer 310, which is here designed as a rigid rod, is connected at its one end to the housing 20 and at its other end to the door 302, wherein it is pivotally supported on the door 302.

Upon activation of the actuator 10, which causes a positively coupled change in length of the variable-length portion and a rotation of the housing 20, and thus of the spacer 310, the variable-length portion, such as the spindle drive 12, of the actuator 10 is shortened, as seen in the sequence of FIGS. 5*a*, 5*b* and 5*c*, and the housing 20, together with the spacer 310, is rotated relative thereto. This has the consequence that the door pivots out of the access opening 308 according to the rotation of the housing 20 and that at the same time the housing 20, and thus a pivot axis of the door 302, is linearly displaced according to the shortening of the variable-length portion of the actuator 10. Due to the coupled rotational and translational displacement of the door 302 out of the access opening 308, a larger entry area 308 can be released or closed.

Figure 6A:
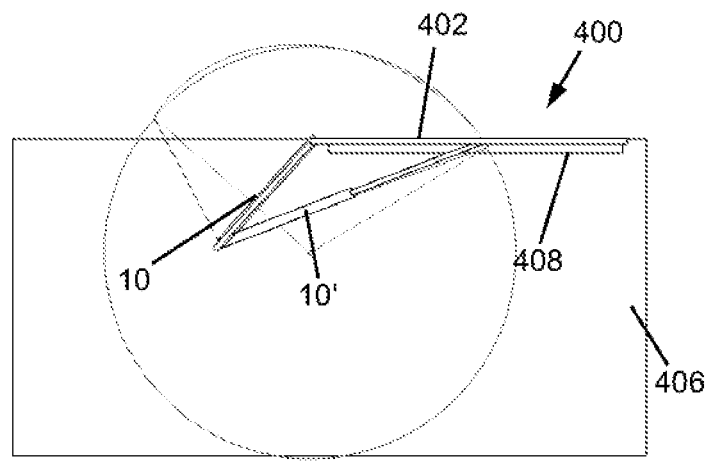
FIG. 6a is a schematic view of a further support device according to the invention in a first position.
Figure 6B:
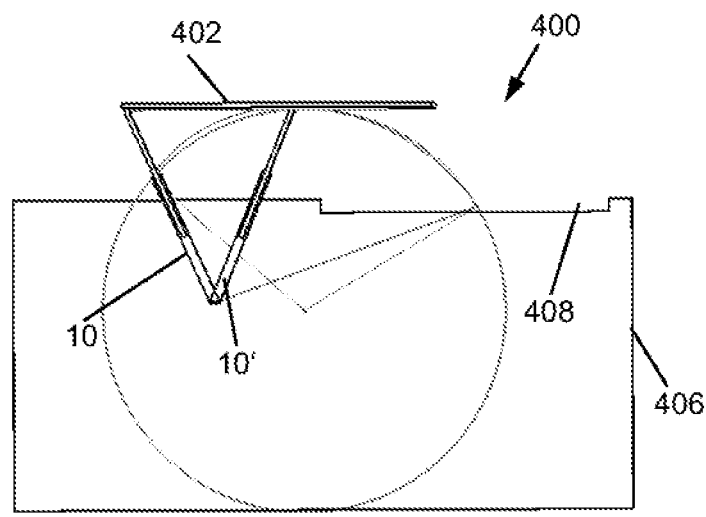
FIG. 6b is a schematic view of the further support device according to the invention in a second position.
Figure 6C:
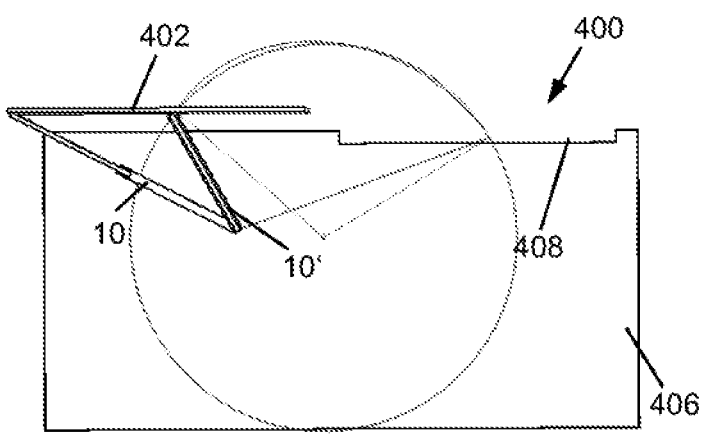
FIG. 6c is a schematic view of the further support device according to the invention in a third position.

To stabilize the door 302, it may be conceivable, for example, to arrange two actuators 10. FIGS. 6*a*, 6*b* and 6*c* a show a further support device 400. The support device 400 differs from the above-mentioned embodiments 100 to 300, to which explicit reference is made, in particular in that two positively coupled actuators, which are realized here by two actuators 10 and 10' according to the invention, are connected at one end to a vehicle body 406 and at the other end to a door 402.

Similar to the above-mentioned embodiments, the door 402 is designed to close or release an access opening 408. In the following, therefore, only the differences from the above-mentioned embodiments will be discussed.

The two actuators 10 and 10' are arranged with their variable-length portion, which is formed in the embodiment shown here by the spindle drive 12, between the vehicle body 406 and the door 402.

The spindle drive 12 of the actuator 10 is hinged to one edge of the door 402, whereas the spindle drive 12 of the further actuator 10' is hinged in the region of a centre of the door 402.

In the particular embodiment illustrated in FIGS. 6*a*, 6*b* and 6*c*, the connecting points of the actuators 10 and 10' coincide on the vehicle body 406.

The thread pitch directions, i.e. the direction of rotation of the threads, of the spindle drives 12 of the actuator 10 and the other actuator 10' are opposite one another, so that, upon rotation of the two variable-length portions of the actuators 10 and 10' in the same direction of rotation, the one portion is extended whereas the other portion is shortened. In the case of an identical thread pitch height of the two threads of the actuators 10 and 10', the door 402 can be displaced parallel in this way, that is, an orientation of the door 402 to the vehicle body 406 remains constant during the displacement of the door 402.

In FIG. 6*a*, the door 402 closes the access opening 408. The actuator 10 is fully retracted and the other actuator 10' is fully extended.

In FIG. 6*b*, the door 402 is displaced out of the access opening 408 and is located approximately at half the displacement range between the maximum positions of FIGS. 6*a* and 6*c*. The variable-length portions of the actuators 10 and 10' are both located approximately at half of their variable-length range. In particular, the variable-length portions of the actuators 10 and 10' are in a same position with respect to their variability in length.

In FIG. 6*c*, the door 402 completely releases the access opening 408. The actuator 10 is fully extended in this case, and the other actuator 10' is fully retracted.

The two actuators 10 and 10' are arranged here, for example, on a lower edge of the door 402 and on a bottom of the vehicle body 406.

Figure 7:
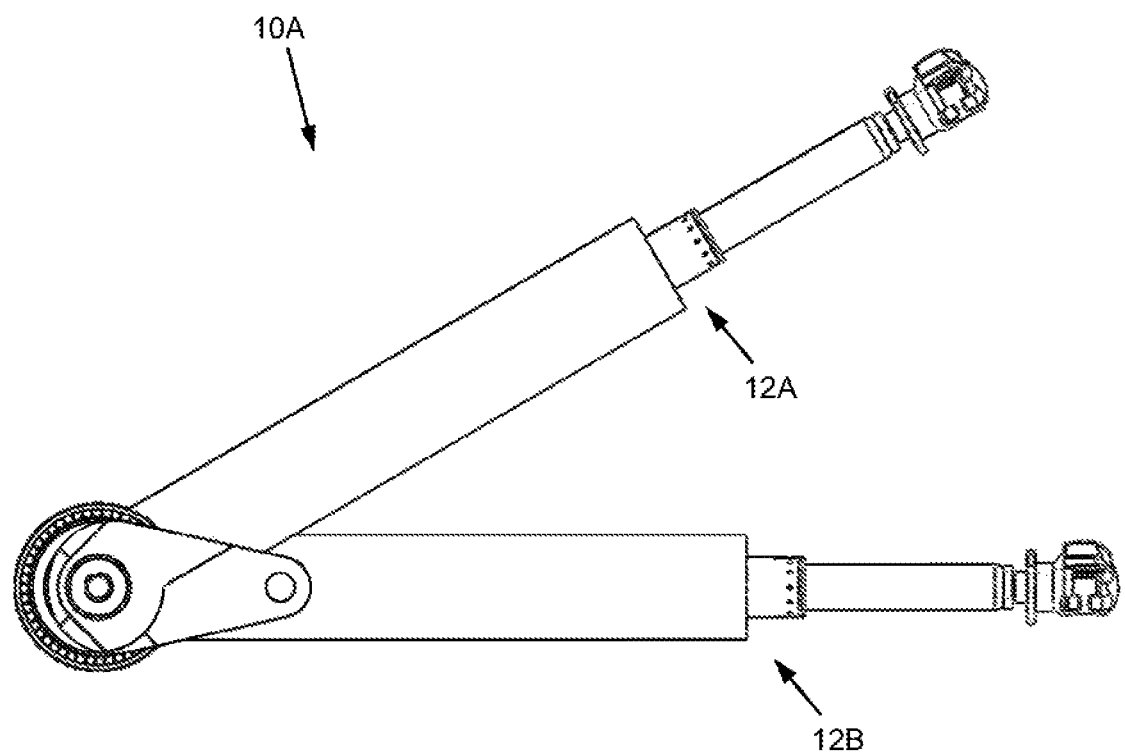
FIG. 7 is a plan view of a second embodiment of an actuator according to the invention.

As shown in FIG. 7, the two actuators 10 and 10' can also be realized by a second embodiment of an actuator 10A according to the invention, which is formed substantially identically to the actuator 10 according to the invention, but, instead of one, comprises two spindle drives, namely a first spindle drive 12A and a second spindle drive 12B.

For this reason, reference is made at this point in relation to the actuator 10A explicitly to the comments on the actuator 10 and 10'. In the following, therefore, only the differences of the actuator 10A to the actuator 10 or 10' will be described.

Figure 8:
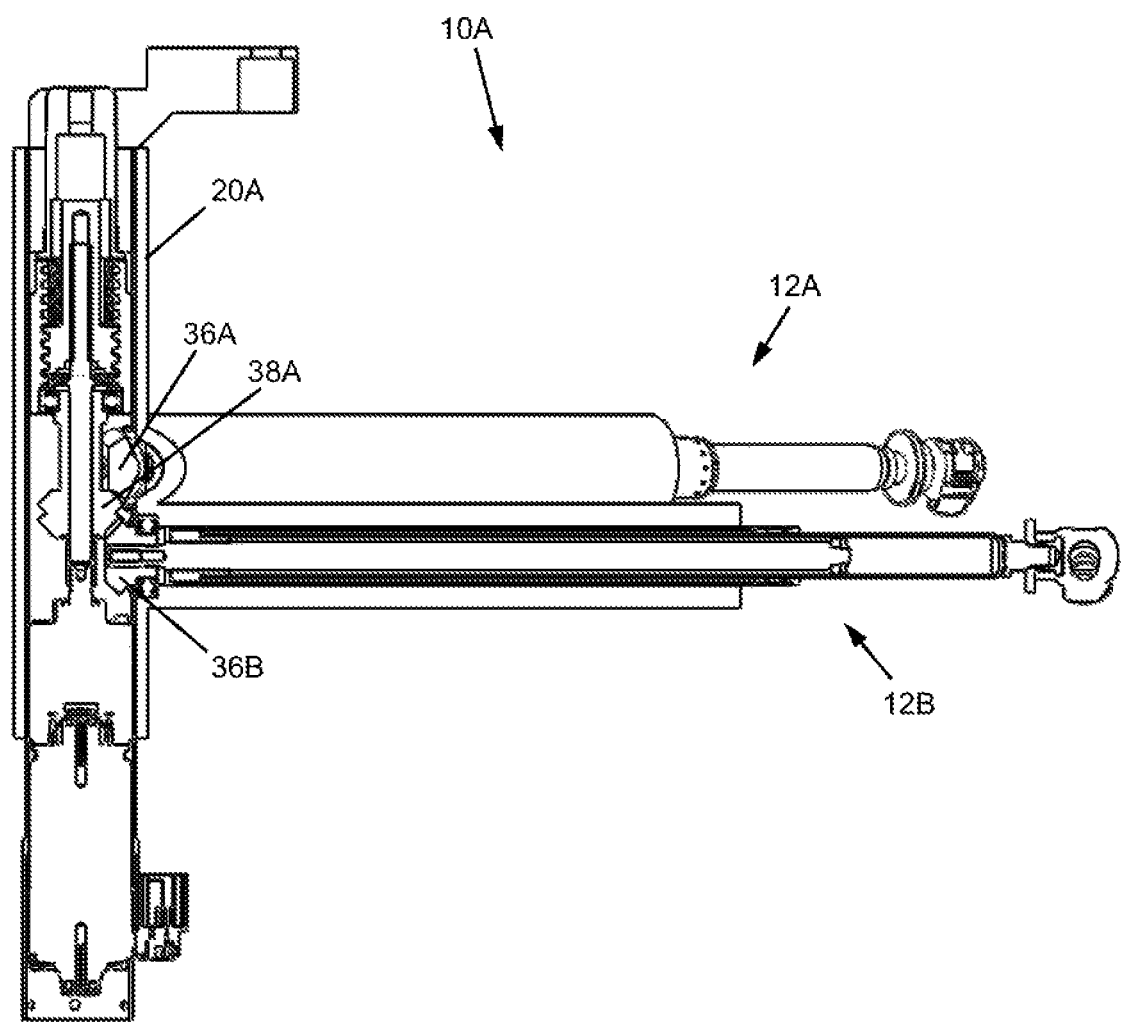
FIG. 8 is a side cross-sectional view of the actuator according to the invention of FIG. 7.

As can be seen in the side cross-sectional view of FIG. 8, the first spindle drive 12A and the second spindle drive 12B extend substantially perpendicularly from the housing 20A of the actuator 10A. As described with respect to the actuator 10, again, the second spindle drive 12B is driven by a gear 38A arranged in the housing 20A. However, the gear 38A, which is also designed here as a bevel gear, not only has a toothing with respect to a gear 36B of the second spindle drive 12B, but also a toothing with respect to a gear 36A of the first spindle drive 12A. The gear 38A can thus be considered as a double-formed bevel gear.

This means that, when the gear 38A is driven, the gears 36A and 36B are also driven and in a manner synchronous relative to a rotation of the gear 38A, so that the first spindle drive 12A and the second spindle drive 12B are operated.

The two spindle drives 12A and 12B may for example have mutually equal thread pitches, which, however, rise in an opposite direction. Thus, upon rotation of the gear 38A, for example, the first spindle drive 12A can be extended by a predetermined distance and the second spindle drive 12B can be shortened by the same distance.

Of course, it is likewise conceivable for the two spindle drives 12A and 12B to have mutually different thread pitches or portions of thread pitches that are different with respect to one another.

The invention claimed is:

1. An actuator comprising:
   a spindle drive comprising a spindle and a spindle nut threadedly engaged with the spindle;
   a first gear fixed to the spindle or the spindle nut for rotation therewith,
   wherein the other one of the spindle nut or the spindle is connected to a first connection unit for connecting the actuator to a first parent assembly, and
   wherein a rotation of the first gear causes a translational displacement of the first connection unit; and
   a second gear engaged with the first gear and a shaft, the first gear, the second, gear, and the shaft disposed in a housing,
   wherein a longitudinal axis of the spindle is inclined with respect to a rotational axis of the second gear,
   wherein rotation of the two gears with respect to one another causes the transitional displacement of the first connection unit and rotation of the spindle drive about the rotational axis of the second gear, or the transitional displacement of the first connection unit causes the rotation of the two gears with respect to one another and the rotation of the spindle drive about the rotational axis of the second gear,
   wherein a transmission assembly is arranged between the shaft and the housing and comprises an intermediate piece that is engaged with a second connection unit for rotation therewith and that is threadedly engaged with each of the housing and the shaft,
   wherein a rotation of the second gear and shaft causes the intermediate piece to be axially displaced relative to housing, and
   wherein the second connection unit connects the actuator to a second parent assembly.

2. The actuator according to claim 1, wherein the actuator is formed such that each position of the spindle nut relative to the spindle is associated with exactly one angular position of the spindle drive about the rotational axis of the second gear and vice versa.

3. The actuator according to claim 1, wherein the rotation of the two gears with respect to one another causes a rotation of the housing relative to the second connection unit.

4. The actuator according to claim 1, wherein the axial displacement of the intermediate piece relative to the housing coincides with the rotation of the second gear and a rotation of the housing.

5. The actuator according to claim 4, wherein the intermediate piece is engaged with the housing via a first portion of the intermediate piece comprising a first thread pitch and is engaged with the shaft via a second portion of the intermediate piece comprising a second thread pitch, the first thread pitch being different from the second thread pitch.

6. The actuator according to claim 1, wherein the actuator comprises a drive unit for driving at least one of the first gear, the second gear, the spindle, the spindle nut and the housing.

7. The actuator according to claim 6, wherein the drive unit comprises an electric motor.

* * * * *